US011425126B1

(12) United States Patent
Horal et al.

(10) Patent No.: US 11,425,126 B1
(45) Date of Patent: Aug. 23, 2022

(54) SHARING OF COMPUTING RESOURCE POLICIES

(71) Applicant: Amazon Technologies, Inc., Seattle, WA (US)

(72) Inventors: Per Mikael Horal, Sammamish, WA (US); Bradford Taylor Lyman, Seattle, WA (US); Luke Edward Kennedy, Seattle, WA (US); Ritwick Dhar, Seattle, WA (US); Anders Samuelsson, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 289 days.

(21) Appl. No.: 14/870,585

(22) Filed: Sep. 30, 2015

(51) Int. Cl.
*H04L 9/00* (2022.01)
*H04L 9/40* (2022.01)

(52) U.S. Cl.
CPC .............. *H04L 63/10* (2013.01); *H04L 63/20* (2013.01)

(58) Field of Classification Search
CPC ....................................................... H04L 63/10

USPC ............................................................. 726/1
See application file for complete search history.

(56) References Cited

U.S. PATENT DOCUMENTS

| 2002/0147801 | A1* | 10/2002 | Gullotta | G06F 21/6218 |
| | | | | 709/223 |
| 2009/0019516 | A1* | 1/2009 | Hammoutene | G06F 21/6245 |
| | | | | 726/1 |
| 2009/0144803 | A1* | 6/2009 | Schreiber | G06F 21/6218 |
| | | | | 726/1 |
| 2016/0170911 | A1* | 6/2016 | Devgan | G06F 12/1483 |
| | | | | 711/118 |

* cited by examiner

*Primary Examiner* — Christopher J Brown
(74) *Attorney, Agent, or Firm* — Davis Wright Tremaine LLP

(57) ABSTRACT

A policy management service receives a request to associate a version of a computing resource policy as a default version of the policy. In response to the request, the service identifies, from a policy database, an entry for the default version of the policy. The service updates the entry in order to associate the version specified in the request as the default version of the policy. This results in the version of the policy becoming applicable to control access to the computing resources associated with principals associated with the default version of the policy.

19 Claims, 12 Drawing Sheets

SHARING OF COMPUTING RESOURCE POLICIES

BACKGROUND

Modern computer systems place a high importance on security of user access to computing resources and on maintaining current and accurate polices for the permissions of computer system users to access those computing resources. Resource owners, and other administrators of resources, often use such computing resource policies to control access by computer system users to computing resources in order to support the business needs of the resource owners, administrators, and users. In a computer system where many users may have several assigned roles, permissions, or policies associated with and relating to many different computing resources, maintaining user roles, permissions, or policies can grow increasingly complex, particularly as the size and/or complexity of the system or the number of computer system users increases.

Accordingly, a resource owner may grant access to resources in order to perform one or more actions on behalf of the resource owner while simultaneously ensuring the security of resources. In order to manage user privileges, a resource owner may delegate authority to access a given resource in a multiplicity of different ways to allow varying levels of access to the resource according to resource access policies. Generally, in large-scale and other computing environments, computing resource policies used to manage user privileges are static and bound to a particular entity. This makes externalizing such policies for other entities difficult, as new policies are needed for each entity to manage their privileges.

BRIEF DESCRIPTION OF THE DRAWINGS

Various embodiments in accordance with the present disclosure will be described with reference to the drawings, in which.

DETAILED DESCRIPTION

Figure 1:
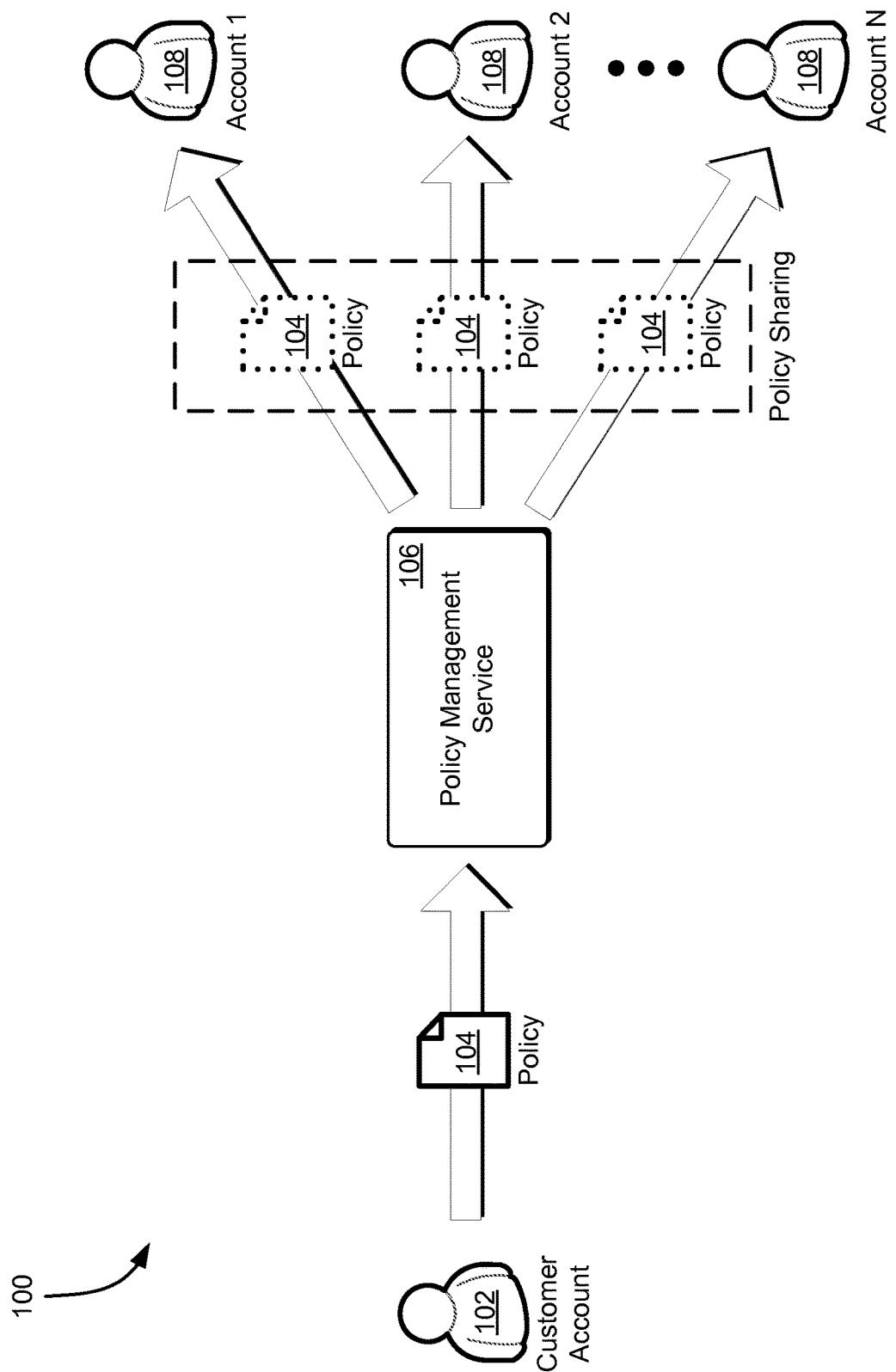
FIG. 1 shows an illustrative example of an environment in which a computing resource policy is shared among various accounts in accordance with at least one embodiment.

This disclosure relates to the sharing and updating of immutable versions of computing resource policies with various user accounts that are associated with the computing resource policies or in response to requests for association of the computing resource policies to these user accounts. In one example, a policy management service detects that a new version of a computing resource policy has been created by an administrator of an account used to create the policy, by another computing resource service, or by another entity having the necessary permissions to generate and manage computing resource policies. Any number of principals (e.g., users) associated with a computing resource service provider may be associated with this particular computing resource policy such that the policy is applicable to the principals of these accounts.

The policy management service may receive a request to define a version of the computing resource policy as the default version of the policy. In response to the request, the policy management service may update the policy database to make the specified version of the policy the default version of the policy, such that any principals associated with the default version of the policy, as specified in the policy database, may automatically be associated with this specified version of the policy. The default version may be, for instance, the most recent version of the policy. Alternatively, if one or more principals are associated with a specific version of the policy, the update of the default version of the policy may not impact the association between these principals and the specific version of the policy. In some examples, the policy management service may notify administrators and other privileged principals associated with accounts of these principals to indicate that the default version of the policy has changed per request by the policy owner.

In some examples, a policy management service can process requests from account administrators to associate one or more principals associated with these accounts to a particular policy. As a result of the policy management service receiving a request to associate one or more principals to a particular policy, the policy management service may identify, from the policy database, the existing versions of the policy that are available for use. Further, based on the received request, the policy management service may determine whether these principals are to be associated with the default version of the policy, as specified in the policy database. If the received request specifies that the principals are to be associated with the default version of the selected policy, the policy management service may update the policy database to generate an association between the principals and the default version of the policy. Further, the policy database may be updated to enable administrators of the account to select specific versions of the policy should these administrators desire to associate an alternative version of the policy rather than the default version of the policy with these principals. However, if the request specifies that the principals of the account are to be associated with a particular version of the policy, the policy management service may update the policy database to associate the account with the specified version of the policy.

The policy management service may also enable account administrators and other services to share computing resource policies with other accounts associated with the computing resource service provider. For instance, in some examples, when a computing resource service receives a request to perform actions on a computing resource, the service may determine whether any shared policies are applicable to the principal making the request. If there are any shared policies available that are applicable to the principal, the service may identify the various parameters of the principal and the principal's account to update any blank parameters in the shared policy that may need to be updated in order to make the shared policy applicable to the principal, its account, and the resources associated with the account. If any of the policy parameters can be updated to make the policy applicable to the principal making the request, the computing resource service may update the policy parameters and apply the updated policies to the principal. The computing resource service may keep the shared policy within a cache such that the service can obtain and update the shared policy as needed in response to requests from various principals.

In this manner, different versions of computing resource policies can be applied to various principals and shared across various accounts. In addition, the techniques described and suggested in this disclosure enable additional technical advantages. For instance, because a policy that is associated with certain principals of various accounts can be updated automatically as a result of a new version of the policy being created, there is no longer a requirement to discard older versions of the policy and generate new versions of the policy for each of the associated principals and accounts. Thus, this may reduce the time and effort required to associate new versions of a particular policy with the associated principals and accounts. Further, by enabling the sharing of policies across various accounts, the computing resource policies no longer need to be static, which eliminates the need to generate new policies each time a change is made to any policy parameters.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 shows an illustrative example of an environment 100 in which a computing resource policy 104 is shared among various accounts 108 in accordance with at least one embodiment. Computing resource policies 104 are collections of permissions associated with a user, a group, a role, an organization, a company, or some other such entity. Each permission may be associated with a computing resource and may specify whether the entity (also referred to herein as a "principal") may access that resource, under what conditions access may be allowed or denied, and/or what type of access may be allowed or denied. For example, a permission may specify that a user named "USER1" may access a certain data storage device denoted by identifier "12345." A more detailed permission may specify that USER1 may only read from resource 12345, but may not write to resource 12345. A still more detailed permission may specify that USER1 may read from resource 12345 at any time, but may only write to resource 12345 between the hours of 9:00 and 9:30 AM. Permissions may also be associated with classes or collections of resources so that, for example, USER1 may have access to a collection of data storage devices, one of which may be resource 12345. Principals may include individual users, accounts, computing resource services, or other principal entities that are allowed or denied access to a computing resource.

Computing resource policies 104 may be maintained by a policy management service 106 and may be stored in a policy database. In an embodiment, a user of a customer account 102 with privileges for modifying permissions and/or for modifying a set of policies (e.g., an administrator or such other user with privileges for modifying a set of policies, also referred to herein as a "privileged user") of an organization may communicate with the policy management service 106 using one or more application programming interface (API) calls to request creation of policies, editing of policies, or deletion of policies. Such policy modification activities (e.g., creating and editing) may also be referred to herein as "authoring" a policy. The policies may, for example, be utilized to establish, for one or more users of the customer account 102, a level of access to one or more resources provisioned by or for the organization and, generally, access rights with respect to the one or more resources provisioned by/for the organization. The organization may be a user of a computing resource service provider that utilizes one or more services such as a virtual computer system service, object-based data storage services, database services, a policy management service and configuration and management service as well as a plurality of other services to create and manage resources and to support operational needs.

Computing resource policies 104 may be authored in a default state such as, for example, denying all access or granting all access. Computing resource policies 104 may also be authored based on organizational business needs and/or may be based on roles within that organization so that, for example, all software developers have the same computing resource policy 104. Computing resource policies 104 may also be authored based on the state of a computer system such that, for example, a policy may grant permission to access an enumerated set of resources that existed when the policy was authored. Such authored policies may not be optimal, ideal, or efficient because they may be under-inclusive (i.e., the policy does not include one or more necessary permissions), they may be over-inclusive (i.e., the policy includes one or more unnecessary permissions), they may be overly simple (i.e., with only a few divisions of roles), they may be overly complex (i.e., with separate permissions for each combination of user, resource, and action), or they may be inefficient or sub-optimal for some other reason.

A policy management service 106 may provide access to, and administration of, policies applicable to requests for access to computing resources (e.g., web service application programming interface requests). For example, the policy management service may receive information sufficient for selecting policies applicable to pending requests. In some embodiments, the information may be copies of the requests, or may be information generated based at least in part on the requests. For example, a service such as a service frontend (described herein) may receive a request for access to resources and may generate a query to the policy management service based at least in part on information specified by the request.

The policy management service 106 may be one of a plurality of services provided by a computing resource service provider. In some embodiments, the policy management service is a distributed computer system configured to centrally manage policies for multiple services operated by the computing resource service provider. Requests for access to service resources (i.e., requests whose fulfillment involves access to the resources themselves and/or information about the resources) may be evaluated against one or more policies associated with the request and/or associated with the requester and those requests that are allowable based on those polices may be performed. API calls to create, edit, and/or delete policies may also be received by the policy management service. As policies may change, so too may the scope of requests that are allowable change. For example, an organization may have a default policy allowing reads from all storage resources of a certain class. Barring a specific policy restricting a certain user from performing such reads, the default policy would permit such reads by any user. A change to a default policy preventing all reads from that class of storage resource may prevent that certain user from reading from such resources, and may require that specific permissions be granted if that user required that access. Granting such permissions may require that the policy be edited to change the permissions.

In an embodiment, a privileged user or administrator of the customer account 102 can transmit one or more API calls to the policy management service 106 to request creation of a computing resource policy 104 that may be shared with other accounts 108 associated with the computing resource service provider such that the policy may be applied to various users of these accounts 108. For instance, the policy that is to be shared may be created such that one or more parameters of the policy are blank or otherwise include a wildcard character or other designation to indicate that the parameter may be modified when applied to another account 108. For instance, if the policy 104 specifies blank entry in place of an identifier for a principal and an identifier for an account of the principal, the policy 104 may be modified to indicate the applicable principal that is subject to the policy 104 and the account of the principal. Similarly, if the policy 104 specifies a wildcard character or other modifiable designation for the target computing resources that are to be subject to the policy 104, when the policy 104 is applied to a particular principal and account, the policy 104 may be modified to be applicable to only the particular computing resources associated with the account.

In response to a request transmitted from the privileged user of the customer account 102 to share a policy 104 with one or more target accounts 108 associated with the computing resource service provider, the policy management service 106 may update a policy database to associate the shared policy 104 with the identified one or more accounts 108 and make the shared policy 104 available to one or more computing resource services. For instance, when a computing resource service, through a run-time service, submits a request to obtain any policies associated with an a principal and the corresponding account, the policy management service 106 may identify the policies that are applicable to the principal and the corresponding account, including any shared policies, and provide these policies to the computing resource service for processing. The computing resource service may determine whether any parameters of the policy 104 are blank or otherwise specify one or more wildcards that may be modified to make the policy 104 applicable to the principal of an account 108 making the request to perform one or more operations.

Figure 2:
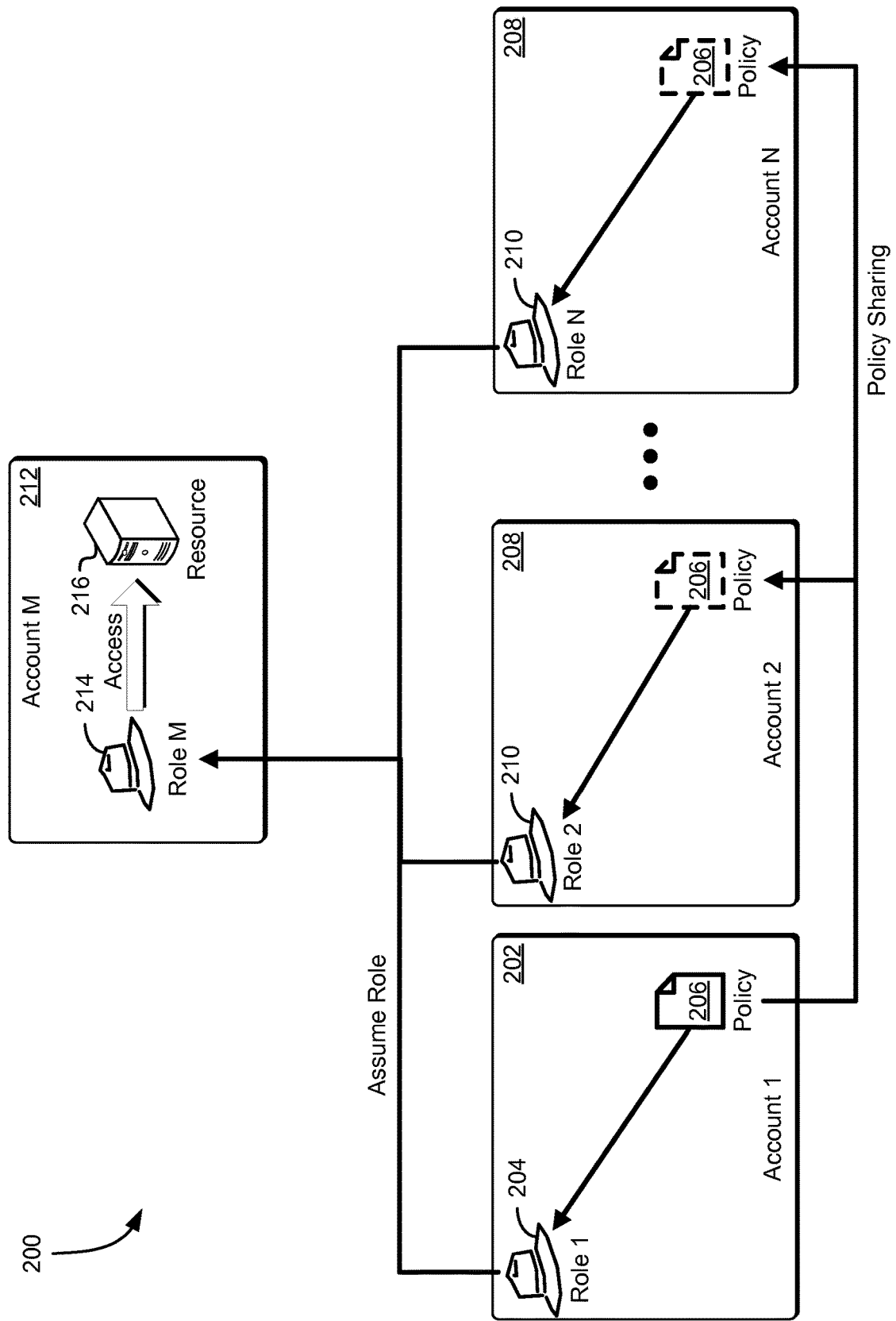
FIG. 2 shows an illustrative example of an environment in which a policy is shared with other accounts to enable users to assume a role for accessing a particular computing resource in accordance with at least one embodiment.

As noted above, a policy owner associated with a particular account may share a policy with other user accounts to enable users of these other user accounts to access one or more computing resources subject to the parameters of the shared policy. In some embodiments, the shared policy can include blank entries, wildcard characters or other modifiable characters that may be updated such that principals can assume different roles for accessing particular computing resources associated with another account. Accordingly, FIG. 2 shows an illustrative example of an environment 200 in which a policy 206 is shared with other accounts 208 to enable principals to assume a role 214 for accessing a particular computing resource 216 in accordance with at least one embodiment.

In the environment 200, a policy owner associated with a first account 202 may transmit a request to a policy management service to generate a new shared policy 206 that may specify that the principal subject to the policy 206 may assume a role 214 (e.g., Role M) within a particular account 212 that enables the principal to access a particular computing resource 216 associated with the particular account 212. For instance, if the policy 206 is associated with a principal of the first account 202 such that the principal may assume a role 204 within the account 202, the principal may submit an API call to a particular service associated with target computing resource 216 to assume a role 214 that enables the principal to access the computing resource 216 and perform one or more operations. The particular service may transmit a request to the policy management service to determine whether there is an applicable policy for the principal that would enable the principal to assume the requested role. If so, the principal may be permitted to assume the role 214 permitted to access the computing resource 216, thereby enabling the principal to access the computing resource 216 by assuming the role 204 within the original account 202.

In an embodiment, a policy owner of the policy 206 can transmit one or more API calls to the policy management service to share the policy 206 with other user accounts 208 associated with the computing resource service provider to enable principals of these other user accounts 208 that are permitted to assume a role 210 within their respective accounts 208 to assume the role 214 permitted to access the computing resource 216. The principals of these other user accounts 208 may be users that access computing resources through direct access to a computing resource service provider. Alternatively, these principals may access these accounts 208 through single sign-on (SSO) federation, which may allow these principals to access these accounts 208 through a remote managed directory, which may authenticate these principals prior to enabling access to the accounts 208. The policy 206 may include blank entries, wildcard characters or other modifiable set of characters within the principal field of the policy 206. In response to this policy 206 being generated by the policy owner through use of the policy management service, the policy management service may make the policy 206 available to computing resource services such that these services may associate the policy with a particular principal of the originating account 202 and to enable the principal to assume a role 204 that is permitted to assume the role 214 permitted to access the computing resource 216. Thus, when a computing resource service receives a request from a principal to access a computing resource 216, the computing resource service may update the policy 206 to associate this policy 206 with the principal in order to enable the principal to assume the role 204 that is permitted to assume a role 214 usable to access the computing resource 216.

The policy owner of the policy 206 may further specify, through one or more API calls to the policy management service that the policy 206 is to be shared with one or more other accounts 208 associated with the computing resource service provider. In response to the policy 206 being shared with other accounts 208, the policy management service may update a policy database to associate this shared policy 206 with the one or more accounts 208. Thus, when a principal transmits a request to a computing resource service to access a particular computing resource 216, the computing resource service may identify the account to which the principal belongs and identify the shared policy 206 from the policy database. The computing resource service may store this shared policy 206 in its cache for future use. Further, the computing resource service may update the blank entries or other modifiable entries in the shared policy 206 to make the shared policy 206 applicable to the principal. The shared policy 206 may indicate that the principal may assume a role 210 that is permitted to assume a role 214 necessary to access the computing resource 216.

In an embodiment, the policy owner can update the policy 206 to update or otherwise modify the roles that may be assumed by principals assigned to other roles 204, 210 associated with the shared policy 206. As an illustrative example, if a new account is introduced that includes a principal that has access to another computing resource, a policy owner that has domain over this new account and associated principal can modify a shared policy 206 to add a new role for the principals that can assume roles 204, 210 subject to the shared policy 206. This may enable these principals to assume the role associated with the new account and access the computing resource. For instance, as a result of a policy owner of the shared policy 206 updating the shared policy 206 to add or remove one or more roles, the policy management service may promulgate these changes to the other accounts 208 associated with the shared policy 206. This may be performed by the computing resource service using the policy by updating the shared policy 206 associated a principal of the associated accounts 202, 208 making a request to access a computing resource.

Figure 3:
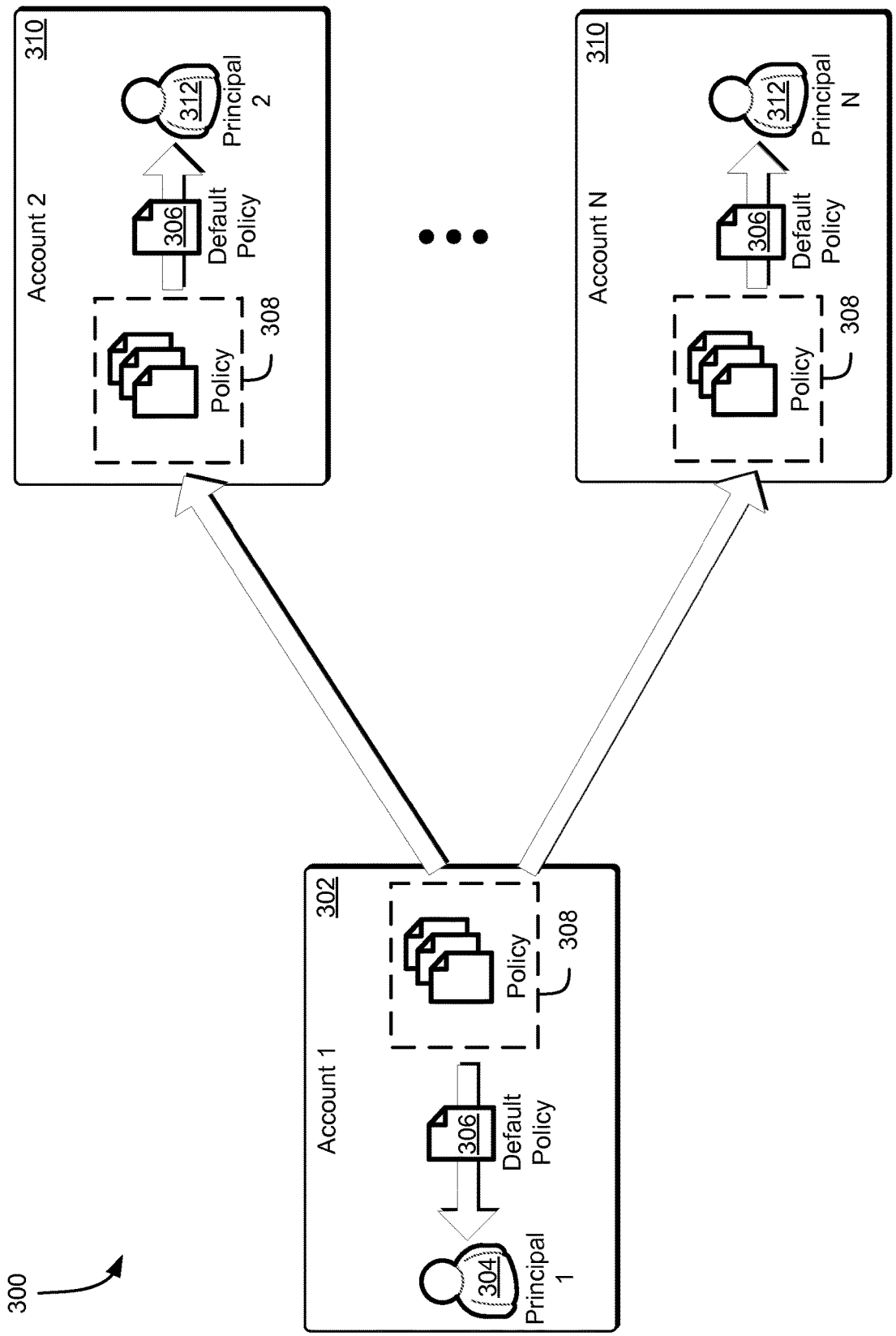
FIG. 3 shows an illustrative example of an environment in which one or more principals attached to a default version of a policy are associated with a different version of the policy as a result of the default version of the policy being updated in accordance with at least one embodiment.

As noted above, account administrators and other privileged users may associate their respective accounts with a particular shared policy made available by a policy owner through a policy management service. The shared policy may have various versions associated it as the policy owner makes further modifications to the shared policy over time. As new versions of a shared policy are created, these new versions may be automatically associated with designed users associated with these accounts if the account is configured to be associated with a default version of the policy. Accordingly, FIG. 3 shows an illustrative example of an environment 300 in which one or more principals 304, 310 attached to a default version of a policy 306 are automatically associated with a different version of the policy as a result of the default version of the policy being updated in accordance with at least one embodiment.

In the environment 300, a policy owner associated with a first account 302 may transmit one or more API calls to a policy management service to generate one or more versions of a computing resource policy 308 that can be made available to other principals of other accounts 310 associated with the computing resource service provider. An administrator or other privileged user of the accounts 310 can transmit a request to a policy management service to associate the policy 308 with one or more principals 312 associated with these accounts 310.

In an embodiment, an administrator or other privileged user of an account 310 can transmit a request to the policy management service to associate one or more principals 312 of the account 310 to a particular policy 308. Further, the administrator or other privileged user of the account 310 may define which version of the policy 306 is to apply for each principal 312 associated with the account 310. The policy 308 may be associated with a number of different versions of the policy created as a policy owner modifies the policy. For instance, if a policy owner defines additional roles that may be assumed by a user within the policy, a new version of the policy 308 may be created that supersedes any older versions of the shared policy. In some instances, this new version of the policy 308 may be deemed to be the default version of the policy 306 that is to be associated with designated principals 304, 312 of the various accounts 302, 310 assigned to the policy 308. It should be noted that a policy owner may select any version of a policy 308 to be the default version of the policy 306 regardless of whether new versions of the policy 308 are generated or not. Thus, a deliberate action by a policy owner may be required to make a particular version of the policy 306 the default version of the policy.

In response to a request to make a particular version of the policy 306 the default version of the policy, the policy management service may update the policy database to define the identified version of the shared 306 as the default version of the shared policy 306. For instance, the policy database may access a policy versions table of the policy database and modify an entry within the table to designate the selected version of the shared policy 306 as the default version of the shared policy 306. Thus, as a result of the policy versions table of the policy database being updated to define a new default version of the shared policy 306, the principals 312 associated with the accounts 310 who are assigned to the default version of the shared policy 306 may automatically be subject to the new default version of the shared policy 308 in response to its generation or selection by the policy owner.

In some embodiments, an administrator or other privileged user of an account associated with a shared policy may specify that one or more principals are to be associated with a specific version of the shared policy that may not be the default version of the policy. For instance, an administrator or other privileged user of the account may want to prevent certain users of the account to assume specific roles or to have additional permissive rights as specified within a default version of the shared policy. Accordingly, FIG. 4 shows an illustrative example of an environment 400 in which one or more principals associated with accounts 410 associated with a specific version of a policy 414 are not associated with a version of the policy as a result of the version of the policy being defined as the default version of the policy in accordance with at least one embodiment.

Figure 4:
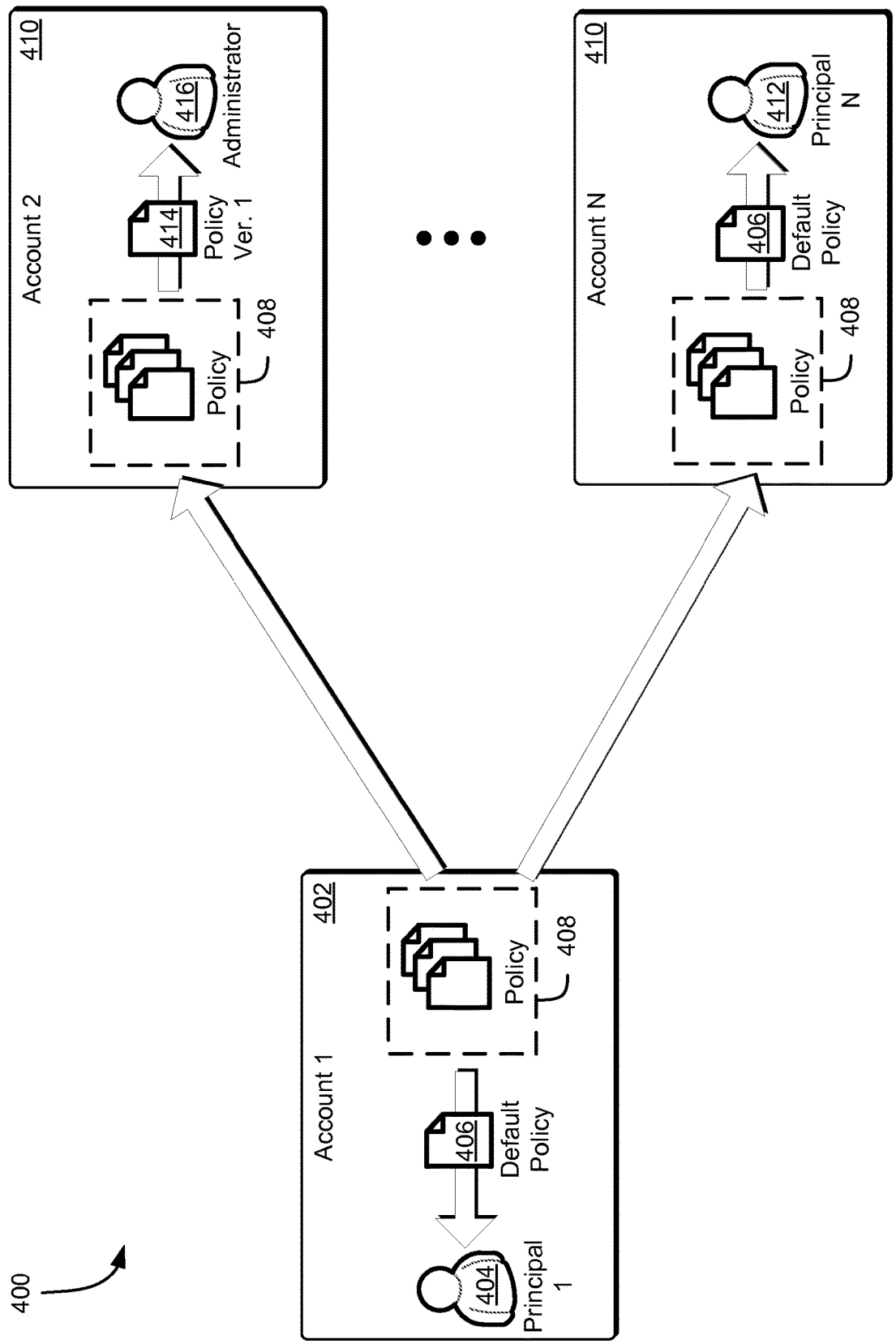
FIG. 4 shows an illustrative example of an environment in which one or more principals associated with accounts associated with a specific version of a policy are not associated with a version of the policy as a result of the version of the policy being defined as the default version of the policy in accordance with at least one embodiment.

In the environment 400, an administrator 416 or other privileged user of an account 410 may transmit a request to a policy management service to associate one or more users of the account 410 with a particular version of the policy 414 (e.g., Policy Ver. 1, as illustrated in FIG. 4) that may be different from the default version of the policy 406 associated with users 404, 412 of other accounts 402, 410. For instance, an administrator 416 or other privileged user of the account 410 may not want to incorporate other versions of the shared policy 408 that have not been thoroughly tested or otherwise may have an impact on the one or more users associated with the account 410.

An administrator 416 of an account 410 may transmit a request to the policy management service to update the policy database such that one or more principals of the account 410 are associated with a specific version of the shared policy. In response to the request, the policy management service may update a policy-user attachments table of the policy database to update an entry for each of the one or more users to specify that the one or more users are associated with a specific version of the shared policy. As a policy owner of the shared policy 408 specifies that a different version of the shared policy 408 is to be designated as the default version of the policy 406, the policy management service may update the policy versions table of the policy database to designate this different version of the shared policy as the new default version of the shared policy. Since the one or more principals as specified by the administrator 416 are associated with a specific version of the shared policy 408, when the policy management service receives a request to identify a policy for one of these users, the policy management service may identify the specific version of the policy rather than the default version of the shared policy. Further, when the default version of the policy is updated to incorporate a different version of the shared policy 408, these one or more users may not be subject to this default version of the shared policy. As an illustrative example, as illustrated in FIG. 4, an administrator 416 or other privileged user of an account 410 may specify that one or more principals of the account 410 are to be associated with a particular version of the shared policy 414. Thus, as a result of the policy management service determining that the one or more principals of the account are associated with a specific version of the account, the policy management service may notify the administrator 416 or other privileged user of the account 410 to indicate that a different version of the shared policy 408 has been defined as the default version of the shared policy 406.

In some embodiments, the policy management service will permit administrators 416 or other privileged users to request that the one or more users of the account be associated with a default version of the shared policy 406 at any time if so desired. This may cause the policy management service to update the policy-user attachments table of the policy database to indicate that the one or more users are now associated with the default version of the shared policy. Thus, when the policy versions table of the policy database is updated to specify a different version of the shared policy as the default, the one or more users are automatically associated with this different version of the shared policy. Similarly, an administrator or other privileged user of an account may transmit a request to the policy management service to associate one or more principals of the account to a specific version of the shared policy 408.

Figure 5:
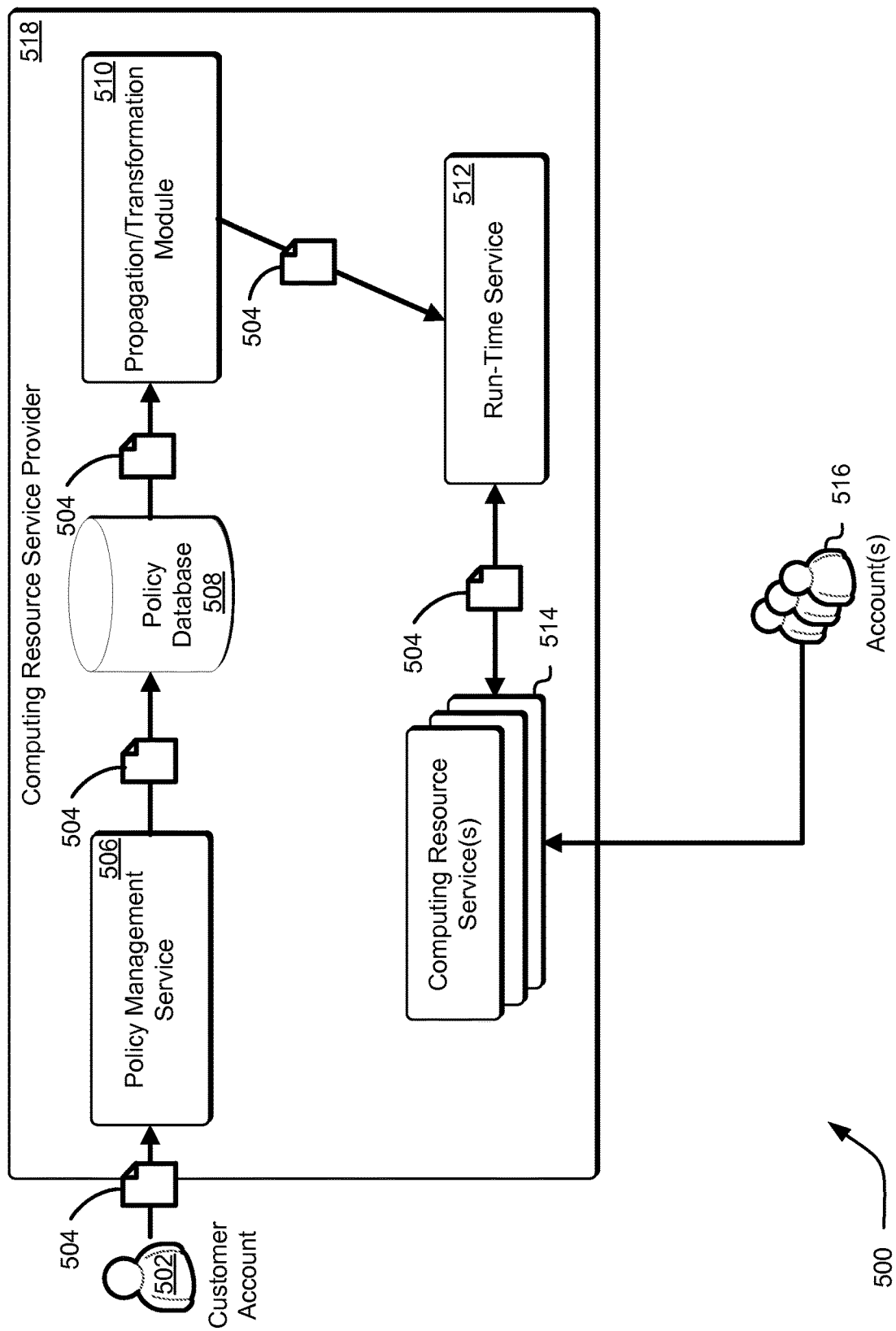
FIG. 5 shows an illustrative example of an environment in which a policy is shared or associated with one or more accounts attached to the policy through one or more components of a computing resource service provider in accordance with at least one embodiment.

FIG. 5 shows an illustrative example of an environment 500 in which a policy 504 is shared or associated with one or more accounts 516 associated with the policy 504 through one or more components of a computing resource service provider 518 in accordance with at least one embodiment. In the environment 500, an administrator or privileged user of a customer account 502 (e.g., policy owner) may access a policy management service 506 provided by a computing resource service provider 518 to request creation of a new shared policy 504. For instance, the policy management service 506 may include an interface, such as a graphical user interface (GUI), which may be used to specify the one or more parameters of the shared policy 504. Alternatively, the policy owner may transmit one or more API calls to the policy management service 506 to request creation of the shared policy 504. The request may further specify one or more target accounts 516 that are to be associated with the shared policy 504 once the policy has been created. In some instances, the shared policy 504 may be made available to these other accounts 516, whereby an administrator or other privileged user of an account 516 may transmit a request to the policy management service 506 to be associated with the shared policy 504.

The policy management service 506 may generate the shared policy 504 in response to the request within a policy database 508. The policy database 508 may be a relational database that may be used to store the shared policy 504. For instance, the policy database 508 may be used to store metadata about the shared policy 504 (e.g., name of the shared policy 504, a policy owner identifier, when the shared policy 504 was generated, current version of the shared policy 504, etc.). The policy database 508 may further include a relational database table that may be used to track individual versions of the shared policy 504. In response to a new shared policy 504 being created, the policy management service 506 may update this relational database table to include one or more versions of the shared policy 504. For instance, in some instances, this relational database table may be updated to indicate a first version of the shared policy 504 and a default version of the shared policy 504, which, upon initial creation of the shared policy 504 may be identical. However, as new versions of the shared policy 504 are created, the default version of the shared policy 504 may correspond to any version of the shared policy 504 as specified by the policy owner. The relational database table may further track the various versions of the shared policy 504 that are available.

The policy database 508 may include an additional relational database table corresponding to the various users and accounts associated with the computing resource service provider 518. This table may specify user and account metadata, such as identifiers for the users and accounts, contact information, associated resources, and the like. The policy database 508 may also include another relational database table corresponding to the attachment or association of a user or account to a particular shared policy 504. For instance, if a user is associated with a particular version of the shared policy 504, the policy management service may update this table to indicate an association between the user and the particular version of the shared policy 504.

If the default version of the shared policy 504 is changed to a different version of the shared policy 504, the policy management service may update the policy database 508 to indicate that this different version of the shared policy 504 is now considered to be the default version of the shared policy 504. The policy database 508 may further include a relational database table for shared policies 504 that may be used to indicate whether a shared policy 504 is associated with any accounts 516 associated with the computing resource service provider 518. This table may include a special identifier that may be used to indicate that the shared policy 504 is shared with all accounts 516 (e.g., wildcard character, etc.).

Once the shared policy 504 has been generated by the policy management service 506 through use of the policy database 508, a propagation/transformation module 510 may obtain information regarding the shared policy 504 or the shared policy 504 itself from the policy database 508. The propagation/transformation module 510 may be a computer system of the policy management service 506, a separate computer system of the computing resource service provider 518, or one or more applications associated with either of these computer systems, that is configured to transform data from the policy database 508 into data that may be stored within a run-time database which is stored within a key-value store that exists on each physical host and that may be accessed by a run-time service 512. For instance, the propagation/transformation module 510 may store each individual version of the shared policy 504 as a unique identifier within the run-time database. This unique identifier may serve as the key in the key-value store. The propagation/transformation module 510 may further store in the run-time database a mapping of user identifiers associated with the accounts 516 to a shared policy version identifier. For the default version of the shared policy 504, the propagation/transformation module may store in the run-time database a mapping of policy identifiers to the policy version identifiers corresponding to the default version of the policies. In response to a new default version of a shared policy 504 being defined, the propagation/transformation module may update the mapping of policy identifiers to the policy version identifiers to correspond to this new default version of the shared policy 504.

The information collected by the propagation/transformation module 510 may be transmitted to a run-time service 512, which may include one or more computer systems configured to be responsible for delivering run-time policies to the individual computing resource services 514 as these computing resource services 514 submit requests to determine whether a particular user is authorized to perform one or more actions through these services 514. For instance, in response to a request from a user associated with a particular account 516 to access a particular resource of a computing resource service 514, the computing resource service 514 may transmit a request to the run-time service 512 to identify any shared policies 504 that may be applicable to the account 516 that the user is a part of. The run-time service 512 may respond to the requesting computing resource service 514 by providing the one or more identified shared policies 504 to the requesting computing resource service 514. In some embodiments, the relevant shared can be cached within each of the computing resource services 514 as they are received. If any of the relevant policies are not cached, the computing resource service 514 may transmit another request to the run-time service 512 to obtain the needed policies to determine whether the user is authorized to perform the requested actions.

In response to the request, the run-time service 512 may access the run-time database to identify the particular version of the shared policy 504 that is applicable to the user. Further, the run-time service 512 may transmit a request to the propagation/transformation module 510 to obtain the identified version of the shared policy 504. The propagation/transformation module 510 may obtain the relevant version of the shared policy 504 from the policy database 508 and provide the version of the shared policy 504 to the run-time service 512 to fulfill the request. The run-time service 512, in turn, may provide the version of the shared policy 504 to the computing resource service 514, which may store the shared policy 504 in its cache. The computing resource service 514 may utilize metadata or other information included in the user's request to populate any fields in the shared policy that may include one or more wildcard or modifiable characters. For instance, the computing resource service 514 may populate the shared policy with a user identifier and an identifier of the account 516 of the user. The computing resource service 514 may utilize this updated shared policy 514 to determine whether the user may perform the one or more requested actions on the targeted computing resource. The computing resource service 514 may maintain the cache with the different shared policies 504 as well as a separate cache that may include a mapping of user identifiers to the corresponding version of the shared policy 504 that is applicable to the user. Thus, when a new user request is received, the computing resource service 514 may identify the appropriate shared policy and update the shared policy based at least in part on the user's identifier and the identifier of the account of the user.

Figure 6:
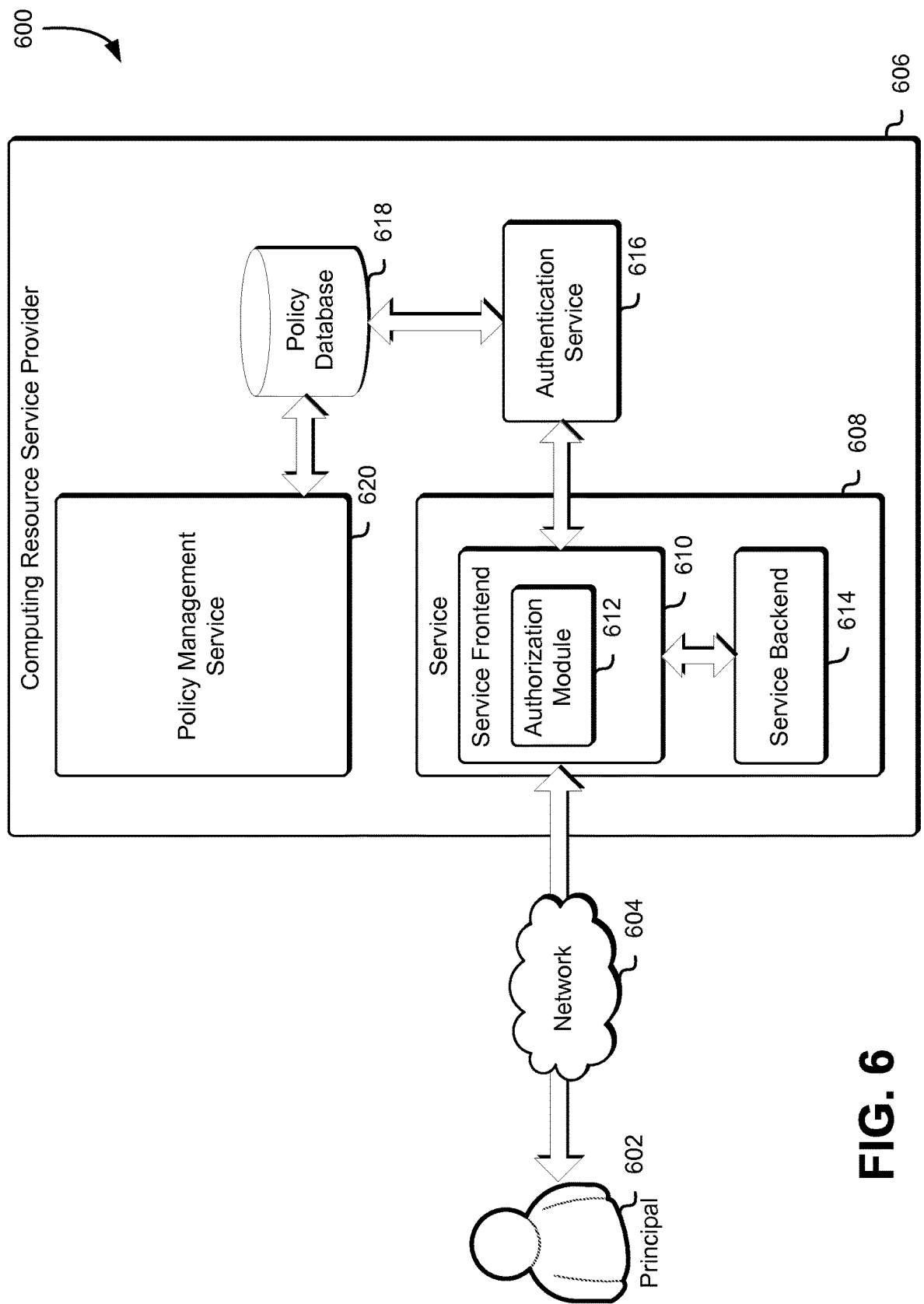
FIG. 6 shows an illustrative example of an environment in which computing resource policies may be managed in accordance with at least one embodiment.

FIG. 6 shows an illustrative example of an environment 600 in which computing resource policies may be managed in accordance with at least one embodiment. In an embodiment, a principal 602 may use a computing device to communicate over a network 604 with a computing resource service provider 606. Communications between the computing resource service provider 606 and the principal 602 may, for instance, be for the purpose of accessing a service 608 operated by the computing resource service provider 606, which may be one of many services operated by the computing resource service provider 606. The service 608 may comprise a service frontend 610 and a service backend 614. The principal 602 may issue a request for access to a service 608 (and/or a request for access to resources associated with the service 608) provided by a computing resource service provider 606. The request may be, for instance, a web service application programming interface request. The principal may be a user, or a group of users, or a role associated with a group of users, or a process representing one or more of these entities that may be running on one or more remote (relative to the computing resource service provider 606) computer systems, or may be some other such computer system entity, user, or process. Each user, group, role, or other such collection of principals may have a corresponding user definition, group definition, role definition, or other definition that defines the attributes and/or membership of that collection. For example, a group may be a group of principals that have the same geographical location. The definition of that group of principals may include the membership of the group, the location, and other data and/or metadata associated with that group. As used herein, a principal is an entity corresponding to an identity managed by the computing resource service provider, where the computing resource service provider manages permissions for the identity and where the entity may include one or more sub-entities, which themselves may have identities.

The principal 602 may communicate with the computing resource service provider 606 via one or more connections (e.g., transmission control protocol (TCP) connections). The principal 602 may use a computer system client device to connect to the computing resource service provider 606. The client device may include any device that is capable of connecting with a computer system via a network, such as example devices discussed below. The network 604 may include, for example, the Internet or another network or combination of networks discussed below.

The computing resource service provider 606, through the service 608, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments.

The request for access to the service 608 may be received by a service frontend 610, which, in some examples, comprises a web server configured to receive such requests and to process them according to one or more policies associated with the service 608. The request for access to the service 608 may be a digitally signed request and, as a result, may be provided with a digital signature. The service frontend 610 may then send the request and the digital signature for verification to an authentication service 616. The authentication service 616 may be a stand-alone service or may be part of a service provider or other entity. The authentication service 616, in an embodiment, is a computer system configured to perform operations involved in authentication of principals. In some examples, requests submitted to the service frontend 610 are digitally signed by the principal (i.e., by a computing device used by or operating on behalf of the principal) using a symmetric cryptographic key that is shared between the principal 202 and the authentication service 616. The authentication service, therefore, may use a copy of the symmetric cryptographic key to verify digital signatures of requests purported to have been generated by the principal 602. However, in other embodiments, the authentication service 616 may be configured to utilize asymmetric cryptography for digital signature verification such as, for example, in response to the principal digitally signing requests using a private cryptographic key. In such embodiments, the authentication service may be configured to trust a certificate authority that digitally signed a certificate of the principal 602 corresponding to the private cryptographic key. Consequently, in some embodiments, the authentication service may use a public cryptographic key specified by the certificate.

Upon successful authentication of a request, the authentication service 616 may then obtain policies applicable to the request. A policy may be applicable to the request by way of being associated with the principal 602, a resource to be accessed as part of fulfillment of the request, a group in which the principal 602 is a member, a role the principal 602 has assumed, and/or otherwise. To obtain policies applicable to the request, the authentication service 616 may transmit a query to a policy database 618 managed by a policy management service 620, which may be the policy management service discussed above in connection with FIG. 5. The policy management service 620 may also determine the policy version associated with the policy by transmitting a query to the policy database 618.

The query to the policy database 618 may be a request comprising information sufficient to determine a set of policies applicable to the request and the associated version for each policy of this set of policies. The query to the policy database may, for instance, contain a copy of the request and/or contain parameters based at least in part on information in the request, such as information identifying the principal, the resource, and/or an action (operation to be performed as part of fulfillment of the request). The policy database 618 may be a database or other system operable to process queries. The policy database 618 may process queries by providing records and/or other such data applicable to the request and/or responsive to the queries. Note that, if authentication of the request is unsuccessful (e.g., because a digital signature could not be verified), policies applicable to the request and/or usage data associated with the policy may not be provided to the requester.

Having obtained any policies applicable to the request, the authentication service 616 may provide an authentication response and, if applicable, the obtained policies back to the service frontend 610. The authentication response may indicate whether the response was successfully authenticated. The service frontend 610 may then check whether the fulfillment of the request for access to the service 608 would comply with the obtained policies using an authorization module 612. An authorization module 612 may be a process executing on the service frontend that is operable to compare the request to the one or more permissions in the policy to determine whether service may satisfy the request (i.e., whether fulfillment of the request is authorized). For example, the authorization module may compare an API call associated with the request against permitted API calls specified by the policy to determine if the request is allowed. If the authorization module 612 is not able to match the request to a permission specified by the policy, the authorization module 612 may execute one or more default actions such as, for example, providing a message to the service frontend that causes the service frontend to deny the request, and causing the denied request to be logged in the policy management service 620. If the authorization matches the request to one or more permissions specified by the policy, the authorization module 612 may resolve this by selecting the least restrictive response (as defined by the policy) and by informing the service frontend whether the fulfillment of the request is authorized (i.e., complies with applicable policy) based on that selected response. The authorization module 612 may also by select the most restrictive response or may select some other such response and inform the service frontend whether the fulfillment of the request is authorized based on that selected response. Note that, while FIG. 6 shows the authorization module 612 as a component of the service frontend 610, in some embodiments, the authorization module 612 is a separate service provided by the computing resource service provider 606 and the frontend service may communicate with the authorization module 612 over a network.

Finally, if the fulfillment of the request for access to the service 608 complies with the applicable obtained policies, the service frontend 610 may fulfill the request using the service backend 614. A service backend 614 may be a component of the service configured to receive authorized requests from the service frontend 610 and configured to fulfill such requests. The service frontend 610 may, for instance, submit a request to the service backend to cause the service backend 614 to perform one or more operations involved in fulfilling the request. In some examples, the service backend 614 provides data back to the service frontend 610 that the service frontend provides in response to the request from the principal 602. In some embodiments, a response to the principal 602 may be provided from the service frontend 610 indicating whether the request was allowed or denied and, if allowed, one or more results of the request.

Figure 7:
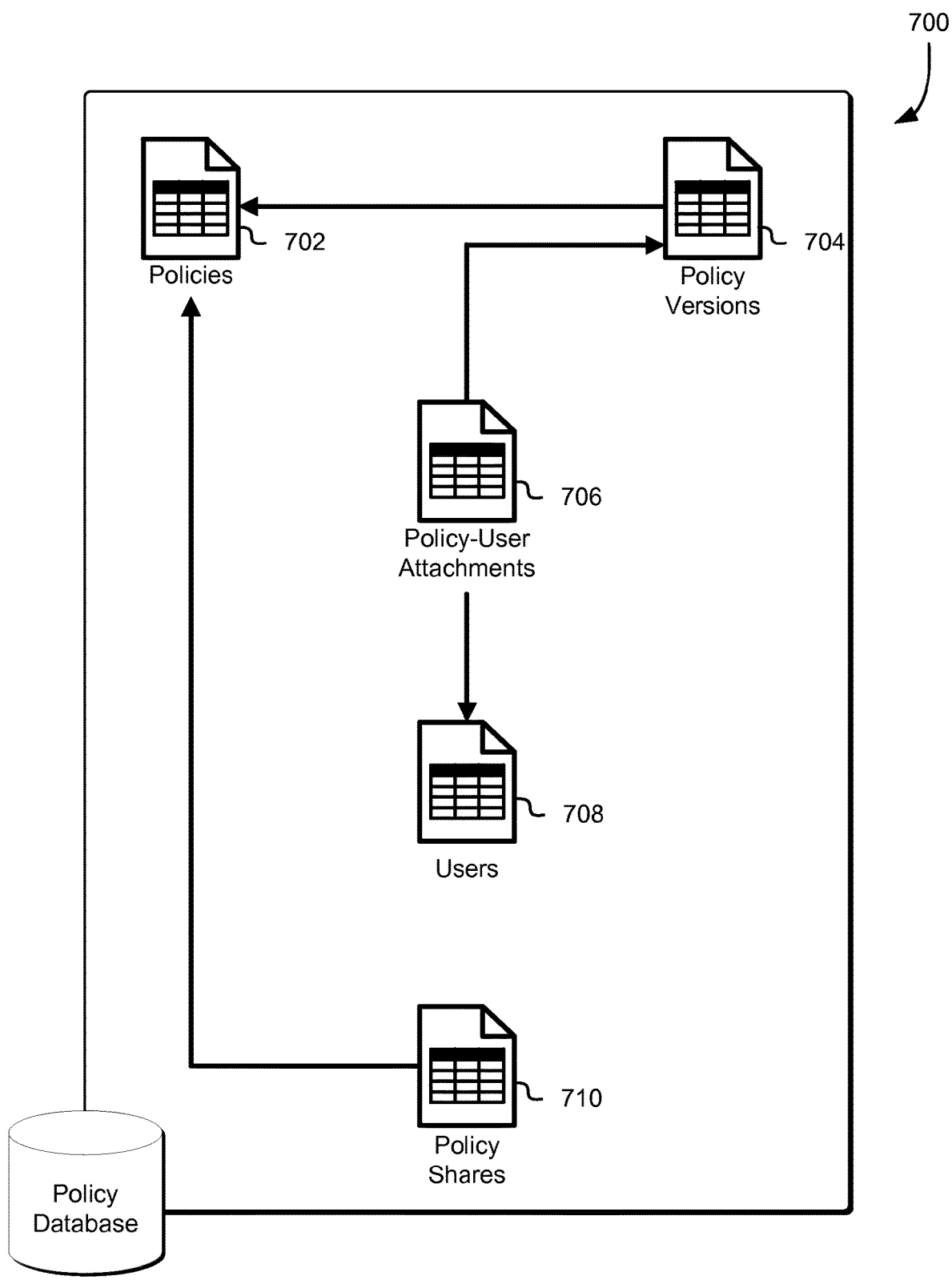
FIG. 7 shows an illustrative example of a policy database in which one or more tables of the policy database are updated based at least in part on the sharing or association of new versions of a policy with one or more principals and their corresponding accounts in accordance with at least one embodiment.

FIG. 7 shows an illustrative example of a policy database 700 in which one or more tables of the policy database 700 are updated based at least in part on the sharing or association of new versions of a policy with one or more accounts in accordance with at least one embodiment. As noted above, the policy database 700 may be a relational database that may be used to store shared policies and other policies that may be associated with users and accounts of the computing resource service provider. For instance, the policy database 700 may include a policies table 702 that may be used to store metadata about the policies (e.g., name of the policy, a policy owner identifier, when the policy was generated, current version of the policy, etc.).

The policy database 700 may further include a policy versions table 704 that may be used to track individual versions of the shared policy. In response to creation of a new policy, the policy management service may update the policy versions table 704 to include one or more versions of the policy. In some instances, this policy versions table 704 may be updated to indicate a first version of the policy and a default version of the policy, which, upon initial creation of the policy may be identical. However, as new versions of the policy are created, the default version of the policy may correspond to any version of the policy as specified by the policy owner. For instance, the policy management service may update an entry in the policy versions table 704 to indicate that a particular version of policy is defined as the default version of the policy. The policy versions table 704 may further track the various versions of the policy that are available.

The policy database 700 may further include a users table 708 that may be used to store information about the various users and accounts associated with the computing resource service provider. The users table 708 may specify user and account metadata, such as identifiers for the users and accounts, contact information, associated resources, and the like. The policy database 700 may also include a policy-user attachment table 706 that may specify the attachments or associations of a user or account to the various policies defined within the policies table 702 and the versions of the policy as defined in the policy versions table 704. For instance, for a user associated with a particular version of the policy, the policy management service may update the policy-user attachments table 706 to indicate an association between the user and the particular version of the policy. In some instances, the policy management service may update the policy-user attachments table 706 to specify that particular users are associated with a default version of a policy. Thus, if the default version of the policy changes at a later time, these users may automatically be associated with this new default version of the policy by virtue of their respective entries in the policy-user attachments table 706 indicating an association with the default version of the policy.

In response to any changes to the default version of the policy, the policy management service may update the policy versions table 704 of the policy database 700 to indicate which version of the policy is now considered to be the default version of the policy. The policy database 700 may further include a policy shares table 710 for shared policies that may be used to indicate whether a shared policy is associated with any accounts associated with the computing resource service provider. This table 710 may include a special identifier that may be used to indicate that the shared policy is shared with all accounts (e.g., wildcard character, etc.).

Figure 8:
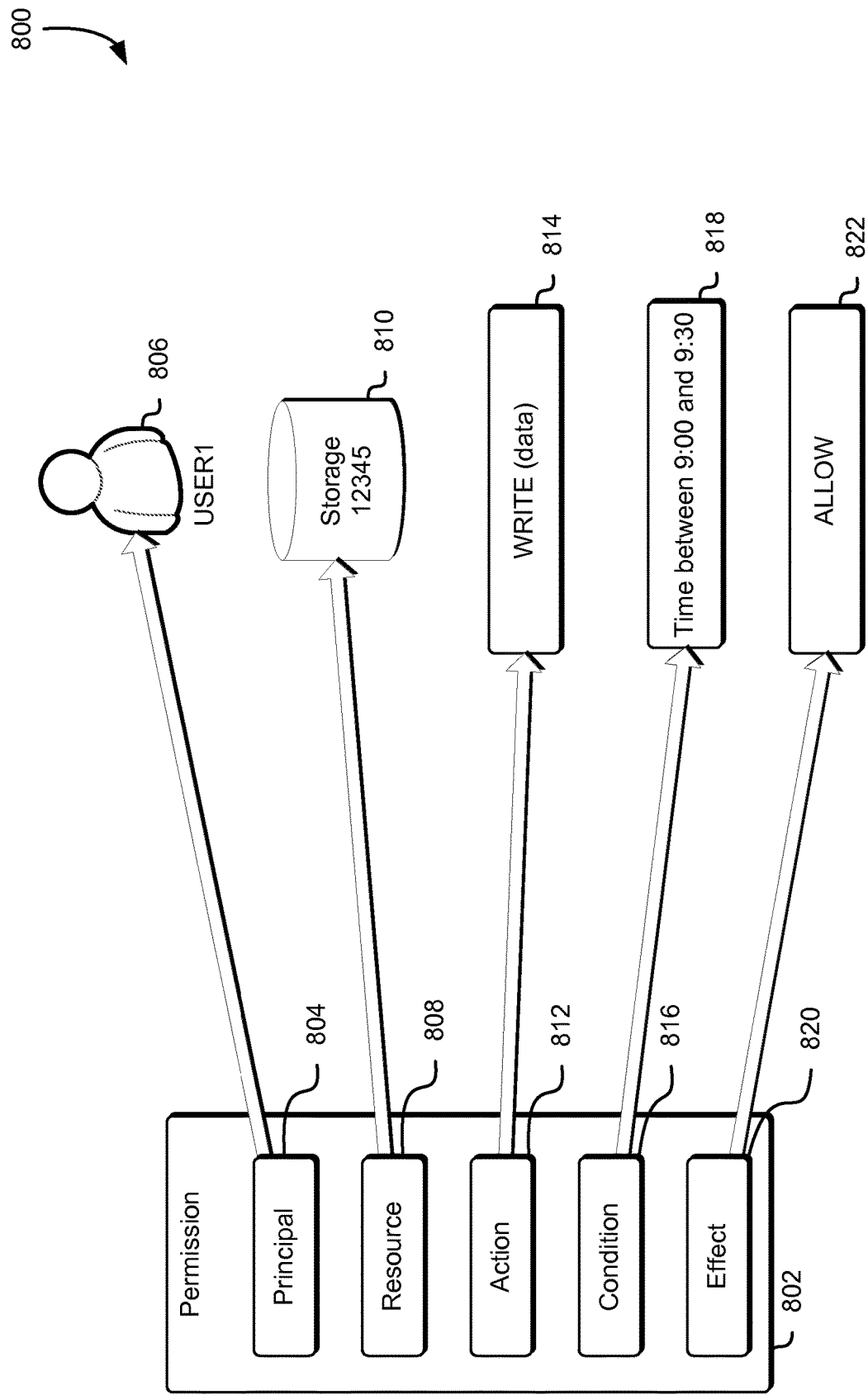
FIG. 8 shows an illustrative example of an example diagram in which a permission associated with a computing resource policy is illustrated in accordance with at least one embodiment.

FIG. 8 shows an illustrative example of an example diagram 800 in which a permission associated with a computing resource policy is illustrated in accordance with at least one embodiment. In an embodiment, a permission 802 may specify a principal 804, a resource 808, an action 812, a condition 816, and an effect 820. In some embodiments, a permission may also specify a plurality of one or more of these elements such as, for example, a set or class of users, a collection of resources, several different actions, and/or multiple conditions. In some embodiments, the permission 802 may specify one or more wildcard or otherwise modifiable characters that may be used to denote that the permission 802 may be modified to make the permission 802 applicable to different users and their associated resources.

The principal 804 may be a user, a group, an organization, a role, or a collection and/or combination of these or other such entities. A principal 804 may be any entity that is capable of submitting API calls that cause an action associated with a resource to be performed and/or any entity to which permissions associated with a resource may be granted. In the example permission 802 illustrated in FIG. 8, the principal 804 is a user 806 identified as "USER1." The action 812 may be any action that may be performed in association with the resource and may, for example, be identified by a type of API call, a library call, a program, process, series of steps, a workflow, or some other such action. For example, an action may be a set of operations that may be performed as part of the fulfillment of an API call to, for example, a web service. The actions that are performed may be a subset of those actions and/or may be a single operation. The operations may also be performed in a defined order, may be repeated, or may be shared between a plurality of API calls. In the example permission 802 illustrated in FIG. 8, the action is an API call to write data to the resource. The permission 802 illustrated in FIG. 8 may be one of a plurality of permissions specified by user policy permissions. The example permission 802 illustrated in FIG. 8 further specifies a storage resource 810 for the resource 808, a data write API call 814 for the action 812, a time condition 818 for the condition 816, and an ALLOW effect 822 for the effect 820. The example permission thus specifies that "USER1 is ALLOWED to WRITE to 12345 between 9:00 AND 9:30 AM."

In an embodiment, if the principal 804 of the permission 802 is an empty set (e.g., blank, containing no characters), the permission 802 may be shared with any users such that in response to the permission 802 being associated with a particular user, a computing resource service utilizing the shared policy may update the principal 804 to denote an identifier of the particular user. Similarly, if the resource 808 is denoted with a wildcard character or other set of modifiable characters, the permission 802 may apply to the resources associated with the principal specified in the permission 802. For instance, if a permission 802 is associated with a particular user, the computing resource utilizing the shared policy may update the resource 808 in the permission 802 to specify the particular user's associated resources. Thus, a permission 802 may be shared and customized based at least in part on the modifiable fields of the permission 802 and the particular user to which the permission 802 is applied.

In some embodiments, the permission 802 may include an account field, which may be used to denote the account associated with the principal 804. A computing resource service may populate the account field within a shared policy to indicate the account of the user 806 submitting a request to perform one or more actions on a computing resource. The account field may be utilized to determine which resources are associated with the account if the resources field 808 includes one or more wildcard or modifiable characters. Thus, the permission 802, when modified to be specific to the specified principal and account, may be applicable to the computing resources specific to the specified account.

Figure 9:
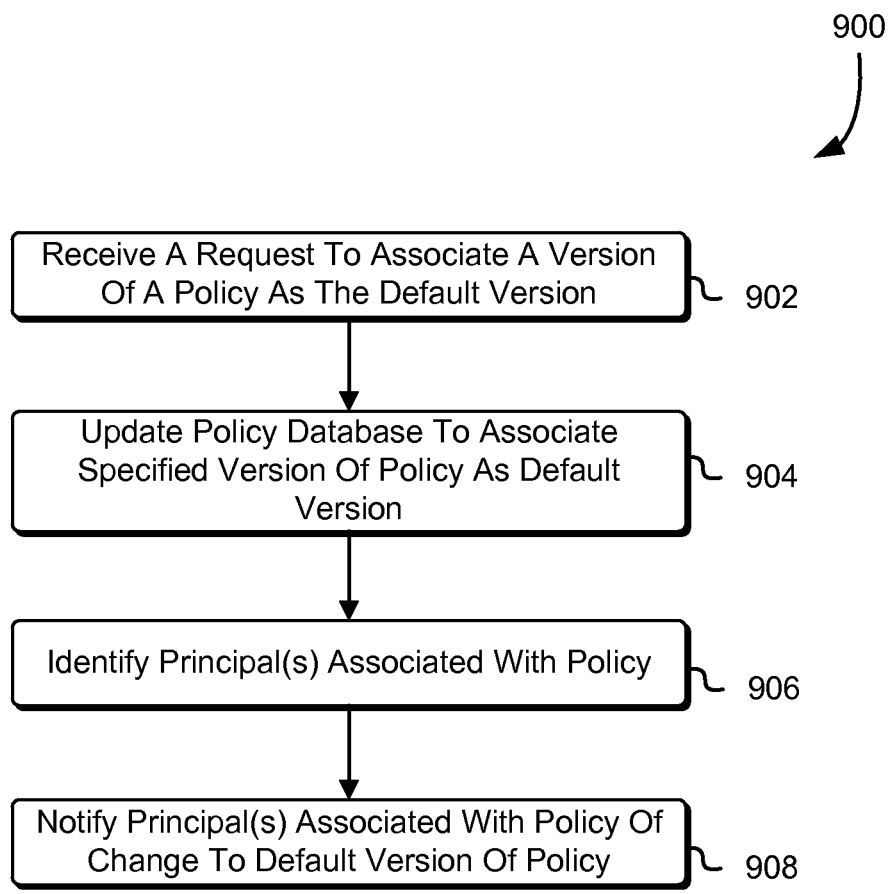
FIG. 9 shows an illustrative example of a process for updating a policy database to identify a particular version of a policy as the default version in response to a request to make the particular version of the policy the default version of the policy in accordance with at least one embodiment.

As noted above, the policy management service may receive a request to designate a particular version of a policy as the default version of the policy. In response, the policy management service may update a policy database to designate the specified version of the policy as the default version of the policy such that principals associated with the default version of the policy are automatically associated with this specified version of the policy. Accordingly, FIG. 9 shows an illustrative example of a process 900 for updating a policy database to identify a particular version of a policy as the default version in response to a request to make the particular version of the policy the default version of the policy in accordance with at least one embodiment. The process 900 may be performed by the aforementioned policy management service, which may be configured to evaluate and update a policy database to associate different versions of the policy as the default version of the policy in response to a request from a policy owner.

At any time, a policy owner of a shared policy may transmit a request to the policy management service to associate a particular version of the shared as the default version of the policy. The request may be transmitted through use of one or more API calls to the policy management service or through use of a GUI provided by the policy management service. As an illustrative example, a policy owner may want to utilize a version of a policy that enables users and accounts associated with the policy to assume additional roles in order to access other computing resources. The policy management may receive 902 this request from the policy owner to associate the specified version of the policy as the default version of the policy.

In response to the request, the policy management service may update 904 a policy database to associate the specified version of the policy as the default version of the policy. For instance, the policy management service may access a policy versions table of the policy database to identify an entry within the table that corresponds to the default version of the policy. This entry may specify which version of the policy is currently defined as being the default version of the policy. The policy management service may update this particular entry to specify that the version of the policy specified in the request is now defined as the default version of the policy. In some embodiments, user entries within the policy database specify which version of the policy is to be associated with each user. For instance, a user entry within a policy-user attachments table of the policy database may specify that a user is associated with the default version of the policy. Thus, when the default version of the policy is updated through the policy database, the user may automatically be associated with this updated version of the policy.

Once the policy database has been updated to associate the specified version of the policy as the default version of the policy, the policy management service may identify 906 the one or more principals (e.g., users) that are associated with the policy. For instance, the policy management service may query the policy database to determine which users are associated with the policy and obtain contact information for these users. This contact information may be utilized by the policy management service to notify 908 the principals associated with the policy of the change to the default version of the policy. For instance, if a principal is not associated with the default version of the policy, the user may notify an administrator of its account to transmit a request to the policy management service such that the user may be associated with the default version of the policy. Further, these notifications may enable the administrator or other privileged user of an account to evaluate the specified policy being used as the default policy and determine whether this version of the policy should be applied to any of the users associated with the account. In some embodiments, the policy management service will notify only the administrators and the privileged users of the accounts having users associated with the policy. This may enable the administrators or privileged users of these accounts to determine which users should be associated with the version of the policy specified as being the default version of the policy.

Figure 10:
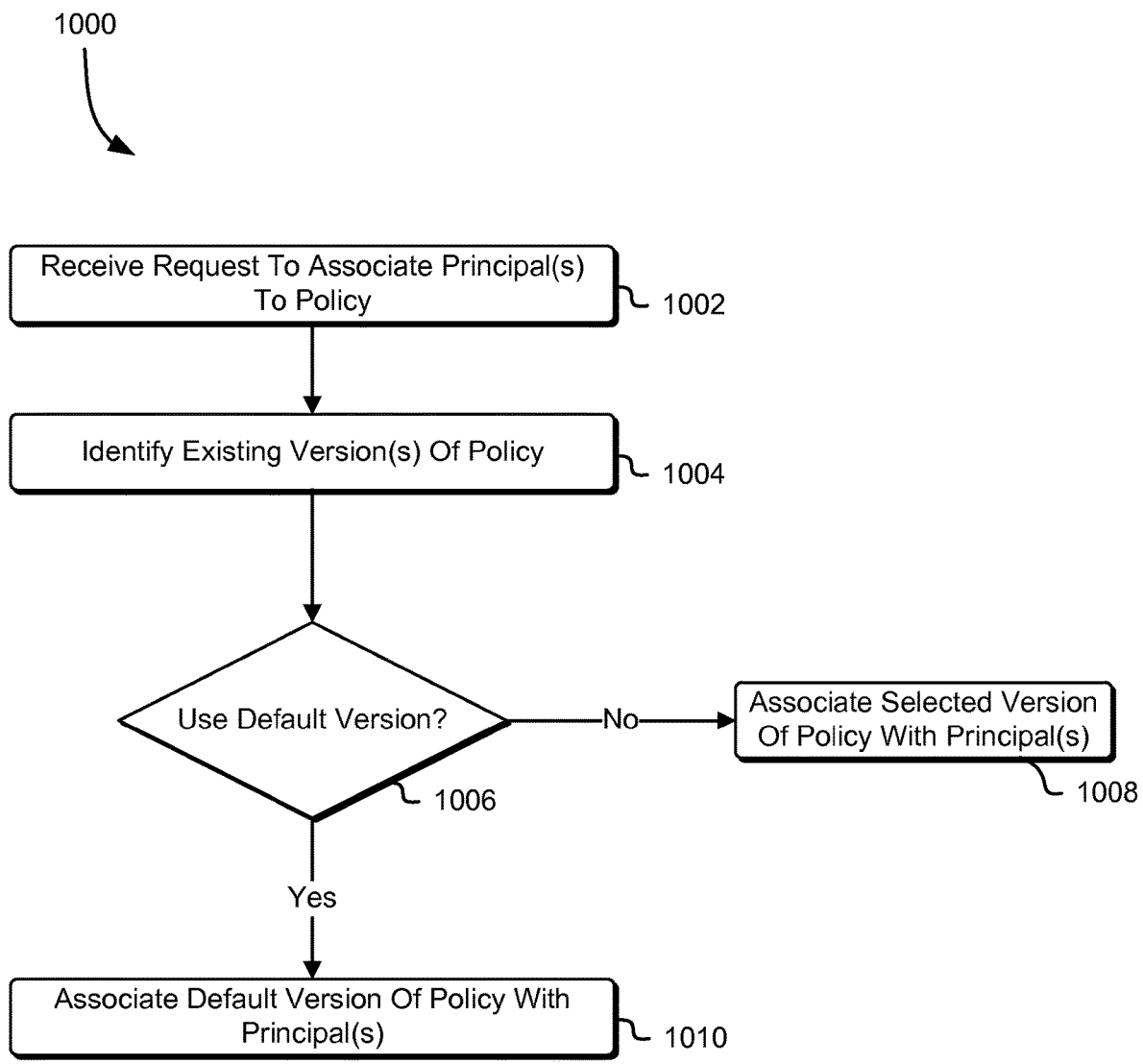
FIG. 10 shows an illustrative example of a process for associating a version of a policy to a principal of an account in response to a request to associate the principal to the policy in accordance with at least one embodiment.

As noted above, an administrator or other privileged user of an account can transmit a request to a policy management service to associate one or more users of the account with a particular policy as provided by the policy owner. Within the request, the administrator or other privileged user may specify whether particular users of the account are to be associated with the default version of the policy or to a specific version of the policy as selected by the administrator or other privileged user. Based at least in part on the request, the policy management service may update the policy database to associate the policy with any specified users associated with the account. Accordingly, FIG. 10 shows an illustrative example of a process 1000 for associating a version of a policy to a principal of an account in response to a request to associate the principal to the policy in accordance with at least one embodiment. The process 1000 may be performed by the aforementioned policy management service, which may be configured to process requests from various administrators or other privileged users of accounts associated with the computing resource service provider to associate one or more principals to a policy.

At any time, an administrator or other privileged user of an account associated with a computing resource service provider can transmit a request to a policy management service to associate one or more principals (e.g., users associated with an account) to a particular policy. The request may be transmitted to the policy management service through one or more API calls to the service. Alternatively, an administrator or other privileged user may utilize an interface provided by the policy management service to create and transmit the request to associate the one or more principals to the policy. Accordingly, the policy management service may receive 1002 this request from the administrator or other privileged user to associated one of more principals of an account to a policy.

Once the policy management service has obtained the request from the administrator or other privileged user to associate one or more principals to the policy, the policy management service may access a policy database to identify 1004 the existing versions of the policy. For instance, the policy management service may refer to the policies table and the policy versions table of the policy database, as illustrated in FIG. 7, to identify what versions of the policy are available and which version of the policy is currently the default version of the policy. Once the policy management service has obtained this information through evaluation of the policy database, the policy management service may evaluate the request to determine 1006 whether the one or more principals identified in the request are to be associated with the default version of the policy or a different version of the policy as selected by the administrator or other privileged user of the account.

If the administrator or other privileged user of the account has requested that the one or more principals are to be associated with a selected version of the policy, the policy management service may associate 1008 the selected version of the policy with the one or more principals. For instance, the policy management service may update the policy database to specify that the one or more principals are associated with the selected version of the policy. Thus, if a new version of the policy is introduced or a default version of the policy is defined, the one or more principals may still maintain an association with the version of the policy selected by the administrator or other privileged user.

Alternatively, if the administrator or other privileged user of the account has requested that the one or more principals are to be associated with the default version of the policy, the policy management service may associate 1010 the default version of the policy with the one or more principals. The policy management service may update the policy database to specify that the one or more principals are associated with the default version of the policy, which may be linked to a version of the policy that has been defined as the default version. In some embodiments, if a new version of the policy is created and is to be defined as the new default version of the policy, the policy management service will update an entry in the policy database to specify that this new version of the policy is the default version of the policy. Thus, any principals associated with the default version of the policy may automatically be associated with this new version of the policy when it is designated as the new default version of the policy.

Figure 11:
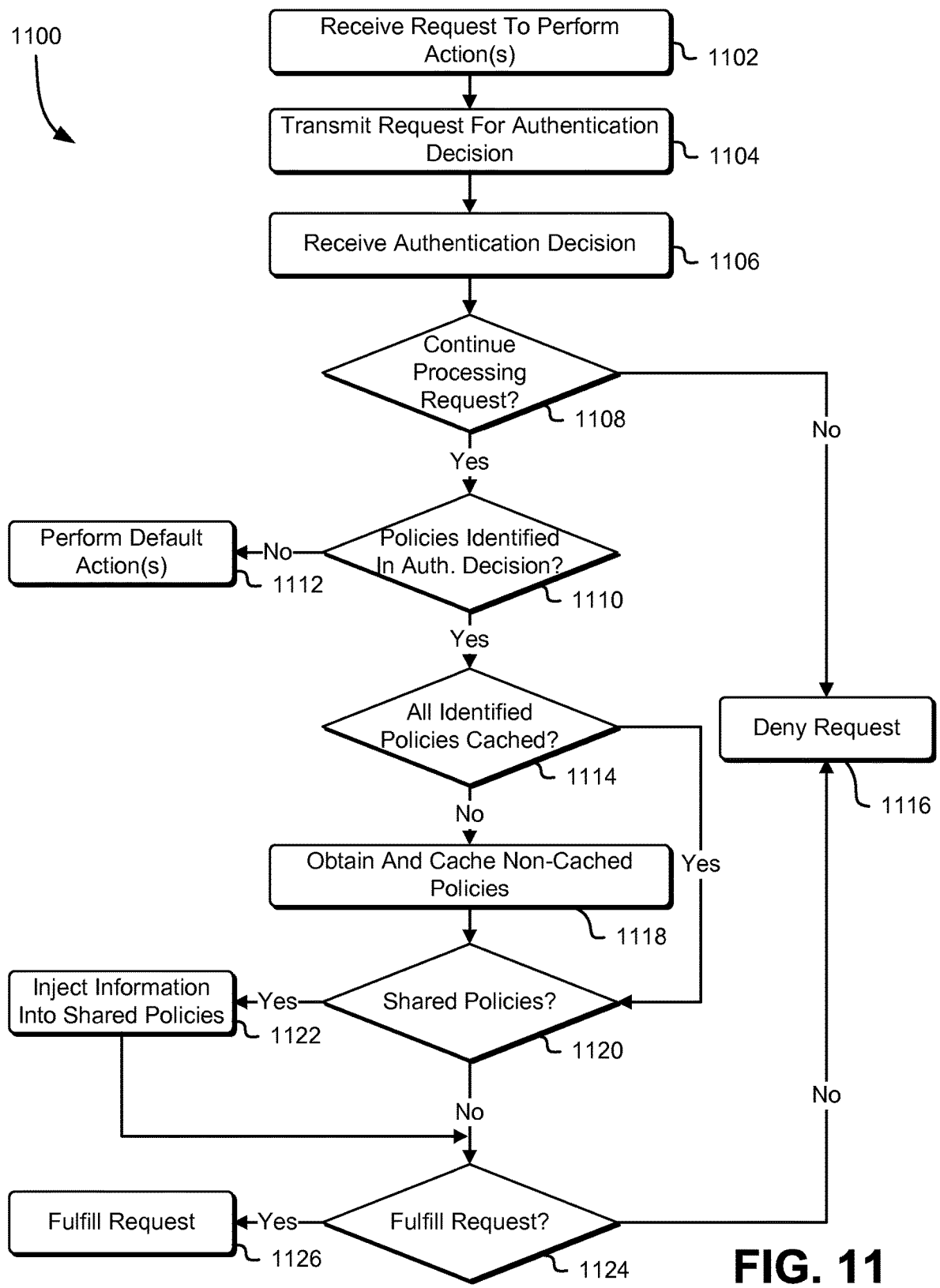
FIG. 11 shows an illustrative example of a process for processing requests based at least in part on policies identified for a principal in accordance with at least one embodiment.

As noted above, a computing resource service may maintain one or more shared policies in a cache in order to process requests from various principals to perform one or more actions on computing resources of the service. These one or more shared policies may include one or more modifiable fields that may be updated to incorporate an identifier for the principal and the associated account of the principal in order to make the one or more shared policies applicable to the principal. Accordingly, FIG. 11 shows an illustrative example of a process 1100 for processing requests based at least in part on policies identified for a principal in accordance with at least one embodiment. The process 1100 may be performed by any computing resource service that includes a cache for various computing resource policies, including shared policies. The computing resource service may also be configured to interact with a run-time, as described in FIG. 5, and a policy management service to obtain any applicable policies that are not available through the cache.

A user (e.g., principal) associated with an account within the computing resource service provider environment may transmit a request to a computing resource service to perform one or more actions on one or more targeted computing resources maintained by the computing resource service. The computing resource service may receive 1102 the request to perform one or more operations on one or more computing resources through a computing resource service frontend, which, in some examples, comprises a web server configured to receive such requests and to process them according to one or more policies associated with the service. The request may be a digitally signed request and, as a result, may be provided with a digital signature. The service frontend may transmit 1104 the request and the digital signature for verification to an authentication service. In some examples, requests submitted to the service frontend are digitally signed by the principal (i.e., by a computing device used by or operating on behalf of the principal) using a symmetric cryptographic key that is shared between the principal and the authentication service. The authentication service may verify the digital signature provided with the request and make an authentication decision whether the request should be processed by the computing resource service or not. Further, the authentication service may identify, from the policy database, one or more policies that may be associated with the principal that should be applied in order to determine whether to fulfill the request.

The computing resource service may receive 1106 the authentication decision from the authentication service and determine 1108, based at least in part on the authentication request, whether to continue processing the request. For instance, the authentication decision may specify whether the computing resource service should continue processing the request based at least in part on the ability of the authentication service to authenticate the principal identified in the request to perform one or more actions on one or more computing resources. For example, if the authentication service is unable to authenticate the principal, the authentication service may indicate that the request should not be processed. Alternatively, if the authentication service is able to authenticate the principal, the authentication service may recommend that the processing of the request continue.

If the authentication decision indicates that the computing resource service should not continue processing the request (e.g., unsuccessful authentication of the principal), the computing resource service may deny 1116 the principal's request. However, if the authentication decision indicates that the computing resource service should continue to process the request (e.g., successful authentication of the principal), the computing resource service may determine 1110 which policies are identified in the authentication decision. If the authentication decision does not specify any policies that may be associated with the principal, the computing resource service may perform 1112 one or more default actions corresponding to a scenario whereby no policies are associated with the principal. For instance, in some embodiments, the computing resource service is configured, by default, to deny any requests to perform one or more actions if there is no policy associated with the principal granting the principal permission to perform the one or more actions. In some alternative embodiments, the computing resource service is instead configured, by default, to fulfill any requests to perform the one or more actions if there is no policy associated with the principal specifically denying permission to perform the requested actions.

If the authentication decision identifies one or more policies that are associated with the principal, the computing resource service may evaluate its cache to determine 1114 whether the identified one or more policies are stored in the cache. The computing resource service may transmit a request to a run-time service to obtain and cache 1118 any identified policies that are not stored in the computing resource service cache. For instance, the computing resource service may specify, within the request, identifiers for the policies identified in the authentication decision. This may cause the run-time service to obtain, from the policy management service and its database; the policies identified in the request and provide these policies to the computing resource service. The computing resource service may cache these policies from the run-time service for later use.

Once the policy management service has obtained and cached the policies from the run-time service or if all of the identified policies in the authentication decision were already in the cache, the policy management service may determine 1120 whether any of these policies are shared policies. As noted above, shared policies may have one or more fields that are blank and may be filled in when applied to a particular principal. Some fields of a shared policy may include one or more wildcard or otherwise modifiable characters that may be used to denote that the properties of these fields are dependent on the principal and associated account specified in the policy. If any of the identified policies are shared policies, the computing resource service may inject 1122 information from the request to perform the one or more actions on one or more computing resources into the identified shared policies. For instance, if a shared policy includes blank entries for the principal and account fields, the computing resource service may inject the shared policy with the identifier of the principal that submitted the request along with the account to which the principal is associated with. The injection of these elements may cause the shared policy to be applicable to the principal and to the computing resources associated with the account.

If there are no shared policies identified in the authentication decision or the computing resource service has completed injecting the information from the request into the identified shared policies, the computing resource service may determine 1124 whether to fulfill the request from the principal. The computing resource service may evaluate the identified policies to determine whether the principal has the requisite permissions to perform the requested one or more actions. For instance, the one or more identified policies may specify that the principal is not authorized to perform the requested one or more actions, which may cause the computing resource service to deny 1116 the request. Alternatively, the one or more policies may specify that the principal is authorized to perform the requested one or more actions, which may cause the computing resource service to fulfill 1126 the request.

The computing resource service may, in some instances, encounter conflicting policies whereby one policy may authorize the customer to perform the one or more actions while another policy may deny the customer permission to perform these actions. In such instances, the computing resource service may utilize one or more conflict resolution rules to determine how to resolve a policy conflict. For instance, the conflict resolution rules may dictate that in the event of a policy conflict, the computing resource service is to prioritize policies that specify a denial of authority to perform the requested one or more actions. Thus, if any of the policies specify that the principal is not authorized to perform the one or more requested actions, the computing resource service may deny the request from the principal. Alternatively, the conflict resolution rules may specify that a grant of authority to perform the requested one or more actions should have greater priority than any denial of authority policies. These conflict resolution rules enable the computing resource service to determine, based at least in part on the identified policies, whether to fulfill the principal's request.

Figure 12:
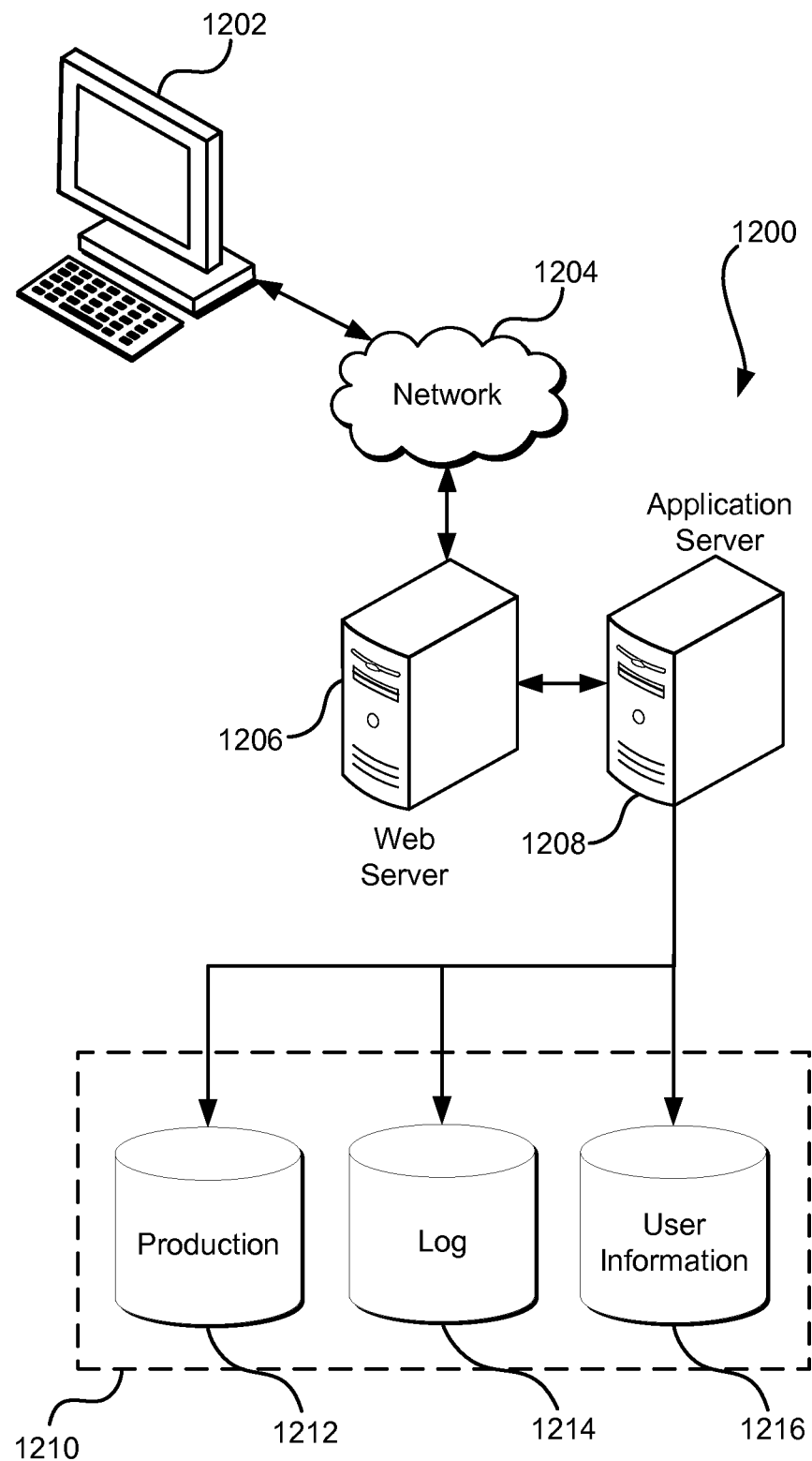
FIG. 12 shows an illustrative example of an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic, or a combination of static and dynamic data in response to received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   indicating, by a first mapping in a database, that access to a first set of computing resources is to be controlled based at least in part on a version of a policy identified as default, wherein the database stores, concurrently with the first mapping, a second mapping that indicates that access to a second set of computing resources is to be controlled based at least in part on a specific version of the policy that is unaffected by changes to which version of the policy is indicated as the default version, wherein the default version is a later version than the specific version;
   obtaining, while the first mapping and second mapping are stored in the database and while the default version and the specific version are different, a request involving access to the first set of computing resources;
   processing the request in accordance with the default version of the policy as a result of the first mapping being stored in the database;
   obtaining a request from a policy owner to delete a version of the policy;
   determining, using information from the database, whether any of a plurality of user accounts are associated with the version of the policy; and
   preventing access to the policy by the policy owner while maintaining an association between the plurality of user accounts and the version of the policy.

2. The computer-implemented method of claim 1, further comprising:
   obtaining an application programming interface call to share a second policy with at least one user account of a plurality of user accounts to access computing resources associated with a computing resource service provider, the second policy comprising one or more parameters modifiable to associate the second policy with the at least one user account;
   identifying one or more characteristics of the at least one user account;
   updating the one or more parameters of the second policy based at least in part on the one or more characteristics of the at least one user account; and
   associating the second policy with the at least one user account such that the second policy is applicable to the at least one user account and usable to access computing resources.

3. The computer-implemented method of claim 1, further comprising, associating an user account with the specific version of the policy and maintaining an association between the user account and the specific version of the policy.

4. The computer-implemented method of claim 1, further comprising:
   obtaining an application programming interface call to associate an user account to the policy;
   determining, based at least in part on the application programming interface call, whether the user account is to be associated with the default version of the policy or the specific version of the policy; and
   as a result of determining that the user account is to be associated with the default version of the policy, associating the user account to the default version of the policy.

5. The computer-implemented method of claim 1, wherein content of the database differentiates between first set of computing resources to be controlled according to the default version of the policy from second set of computing resource to be controlled according to specific version of the policy.

6. A system, comprising:
   memory to store instructions that, as a result of being executed by one or more processors of the system, cause the system to:
      indicate, by a first mapping in a database, that access to a first set of computing resources is to be controlled based at least in part on a version of a policy identified as a default, wherein the database stores, concurrently with the first mapping, a second mapping that indicates that access to a second set of computing resources is to be controlled based at least in part on a specific version of the policy that is unaffected by changes to which version of the policy is indicated as the default version;
      obtain, while the first mapping and second mapping are stored in the database and while the default version is a different and later version of the specific version, a request involving access to the first set of computing resources;
      process the request in accordance with the default version of the policy as a result of the first mapping being stored in the database;
      obtain a request from a policy owner to delete a version of the policy;
      determine, using information from the database, whether any of a plurality of user accounts are associated with the version of the policy; and
      if any of the plurality of user accounts are associated with the version of the policy, prevent further access to the policy by the policy owner while maintaining an association between the plurality of user accounts and the version of the policy.

7. The system of claim 6, wherein the instructions, as a result of being executed by one or more processors, further cause the system to at least:
   obtain a second request to associate an user account of a plurality of user accounts to the policy;
   determine, based at least in part on the second request, whether the user account is to be associated with the default version of the policy or to the specific version of the policy;
   if the user account is to be associated with the default version of the policy, update the database to associate the user account with the default version of the policy; and if the user account is to be associated with the specific version of the policy, update the database to associate user account with the specific version of the policy.

8. The system of claim 6, wherein the request is an application programming interface call.

9. The system of claim 6, wherein the instructions, as a result of being executed by one or more processors, further cause the system to at least:
    obtain a second request to share a second policy with at least one user account of a plurality of user accounts;
    identify one or more characteristics of the at least one user account; and
    update the second policy based at least in part on the one or more characteristics of the at least one user account such that the second policy is applicable to computing resources of the at least one user account.

10. The system of claim 9, wherein:
    the second policy includes one or more fields that are modifiable to enable the second policy to be applicable to the at least one user account; and
    the instructions, if executed by one or more processors, further cause the system to at least modify the one or more fields to update the second policy.

11. The system of claim 6, wherein the instructions, as a result of being executed by one or more processors, further cause the system to at least: notify a plurality of user accounts that a first version of the default version of the policy changed to a second version of the policy to enable the plurality of user accounts to request association with the second version of the policy.

12. The system of claim 6, wherein the instructions, as a result of being executed by one or more processors, further cause the system to at least:
    associate a subset of a plurality of user accounts with the specific version of the policy; and
    update the database to associate the specific version of the policy with the subset.

13. A non-transitory computer-readable storage medium comprising stored thereon executable instructions that, as a result of being executed by one or more processors of a computer system, cause the computer system to at least:
    indicate, by a first mapping in a database, that access to a first set of computing resources is to be controlled based at least in part on a version of a policy identified as default, wherein the database stores concurrently with the first mapping a second mapping that indicates that access to a second set of computing resources is to be controlled based at least in part on a specific version of the policy that is unaffected by changes to which version of the policy is indicated as the default version, wherein the version of the policy identified as default is a later version than the specific version;
    obtain, while the first mapping and second mapping are stored in the database and while the default version and the specific version are different, a request involving access to the first set of computing resources;
    process the request in accordance with the default version of the policy as a result of the first mapping being stored in the database;
    obtain a request from a policy administrator to delete a version of the policy; and
    determine whether any of a plurality of user accounts are associated with the version of the policy such that:
        if any of the user accounts are associated with the version of the policy, an association between the version of the policy and the user accounts is maintained; and
        if no user accounts are associated with the version of the policy, the version of the policy is deleted.

14. The non-transitory computer-readable storage medium of claim 13, wherein the instructions further cause the computer system to:
    obtain a request from an user account of a plurality of user accounts to associate the user account with the specific version of the policy; and
    update the database to associate the user account with the specific version of the policy such that access to the second set of computing resources is unaffected when another version of the policy is specified.

15. The non-transitory computer-readable storage medium of claim 14, wherein the request is obtained through one or more application programming interface calls generated by an owner of the policy.

16. The non-transitory computer-readable storage medium of claim 13, wherein the instructions further cause the computer system to:
    obtain a second request from an user account of a plurality of user accounts to associate the user account with the default version of the policy; and
    update the database to associate the user account with the default version of the policy.

17. The non-transitory computer-readable storage medium of claim 13, wherein the instructions further cause the computer system to:
    obtain a request to share a second policy with at least one user account of a plurality of user accounts, the second policy including one or more modifiable fields usable to customize the second policy for the at least one user account;
    identify one or more characteristics of the at least one user account associated with the one or more modifiable fields; and
    update the one or more modifiable fields of the second policy for the at least one user account based at least in part on the one or more characteristics such that the second policy becomes applicable to control access to computing resources of the at least one user account.

18. The non-transitory computer-readable storage medium of claim 13, wherein the instructions further cause the computer system to transmit one or more notifications to a plurality of user accounts to indicate that the default version of the policy changed from a first version to a second version of the policy.

19. The non-transitory computer-readable storage medium of claim 13, wherein the instructions further cause the computer system to:
    associate each user account of a plurality of user accounts to a version of the policy; and
    determine, based at least in part on the request, whether each user account is to be associated with the default version of the policy or to the specific version of the policy.

* * * * *